US008974662B2

(12) United States Patent
Gannon

(10) Patent No.: US 8,974,662 B2
(45) Date of Patent: Mar. 10, 2015

(54) FILTRATION OF A PUMPED HYDROCARBON CONTAINING LIQUID

(76) Inventor: William J Gannon, Northford, CT (US)

(*) Notice: Subject to any disclaimer, the term of this patent is extended or adjusted under 35 U.S.C. 154(b) by 0 days.

(21) Appl. No.: 13/424,346

(22) Filed: Mar. 19, 2012

(65) Prior Publication Data

US 2012/0325734 A1   Dec. 27, 2012

Related U.S. Application Data

(63) Continuation-in-part of application No. 10/284,516, filed on Oct. 30, 2002, now Pat. No. 8,137,564.

(51) Int. Cl.
*B01D 24/02* (2006.01)
*B01D 24/48* (2006.01)
*B01D 15/00* (2006.01)

(52) U.S. Cl.
USPC ..... 210/97; 210/121; 210/170.03; 210/172.1; 210/172.3; 210/194; 210/248; 210/282; 210/416.1; 210/111; 210/502.1; 210/693

(58) Field of Classification Search
None
See application file for complete search history.

(56) References Cited

U.S. PATENT DOCUMENTS

| | | | | |
|---|---|---|---|---|
| 3,844,122 A * | 10/1974 | Bliss, Jr. | | 405/108 |
| 3,930,590 A * | 1/1976 | Ebbrell | | 220/560.03 |
| 4,116,835 A * | 9/1978 | Bertelson | | 210/100 |
| 4,136,997 A * | 1/1979 | Chapman | | 405/210 |
| 4,765,775 A * | 8/1988 | Kroger | | 405/52 |
| 4,862,909 A * | 9/1989 | Kim | | 137/150 |
| 5,120,160 A * | 6/1992 | Schwengel | | 405/128.45 |
| 5,242,604 A * | 9/1993 | Young et al. | | 210/768 |
| 5,391,295 A * | 2/1995 | Wilcox et al. | | 210/165 |
| 5,462,655 A * | 10/1995 | Ladd et al. | | 210/167.01 |
| 5,511,904 A * | 4/1996 | Van Egmond | | 405/52 |
| 5,595,457 A * | 1/1997 | Stucks | | 405/87 |
| 5,679,246 A * | 10/1997 | Wilcox et al. | | 210/165 |
| 5,788,410 A * | 8/1998 | Stucks | | 405/87 |
| 5,820,762 A * | 10/1998 | Bamer et al. | | 210/661 |
| 5,935,427 A * | 8/1999 | Witter et al. | | 210/93 |
| 6,021,792 A * | 2/2000 | Petter et al. | | 134/111 |
| 6,099,723 A * | 8/2000 | Morris et al. | | 210/170.03 |
| 6,106,707 A * | 8/2000 | Morris et al. | | 210/163 |
| 6,164,298 A * | 12/2000 | Petter et al. | | 134/104.4 |
| 6,304,444 B1 * | 10/2001 | Combs et al. | | 361/695 |
| 6,485,639 B1 * | 11/2002 | Gannon et al. | | 210/164 |
| 6,503,390 B1 * | 1/2003 | Gannon | | 210/164 |
| 6,565,758 B1 * | 5/2003 | Thomas | | 210/776 |
| 6,719,910 B1 * | 4/2004 | Thiem et al. | | 210/702 |
| 6,841,077 B2 * | 1/2005 | Gannon et al. | | 210/692 |
| 7,014,755 B2 * | 3/2006 | Muir et al. | | 210/164 |
| 7,128,831 B2 * | 10/2006 | Newman | | 210/99 |
| 7,297,260 B2 * | 11/2007 | Hjerpe et al. | | 210/251 |
| 7,361,282 B2 * | 4/2008 | Smullin | | 210/703 |
| 7,445,704 B2 * | 11/2008 | Jorgensen | | 210/86 |
| 7,485,218 B2 * | 2/2009 | Dussich, I | | 210/164 |
| 7,527,738 B2 * | 5/2009 | Gonzalez et al. | | 210/690 |
| 7,540,953 B2 * | 6/2009 | Fitzgerald | | 210/162 |
| 7,578,930 B2 * | 8/2009 | Williamson et al. | | 210/86 |
| 7,686,540 B2 * | 3/2010 | Urriola | | 405/43 |

(Continued)

*Primary Examiner* — Robert James Popovics
(74) *Attorney, Agent, or Firm* — The Miller Law Offices, PLC; Steven J. Miller, Esq.

(57) ABSTRACT

An apparatus for and method of filtering hydrocarbon contaminated water, which is used in a system requiring a pump to lift low lying hydrocarbon contaminated liquids from said pump through a filtration system which lifts and completely filters all debris and hydrocarbons from said liquid.

3 Claims, 2 Drawing Sheets

(56) References Cited

U.S. PATENT DOCUMENTS

| | | |
|---|---|---|
| 7,799,235 B2* | 9/2010 | Olson et al. ............... 210/767 |
| 7,874,764 B2* | 1/2011 | Fossen et al. .............. 405/60 |
| 8,137,564 B2* | 3/2012 | Gannon .................... 210/691 |
| 8,153,001 B2* | 4/2012 | Peters ...................... 210/232 |
| 8,158,010 B2* | 4/2012 | Pearse et al. ............ 210/747.1 |
| 8,216,479 B2* | 7/2012 | Lambert et al. .......... 210/747.3 |
| 8,268,179 B2* | 9/2012 | Peters ...................... 210/767 |
| 8,272,390 B2* | 9/2012 | McCormick et al. ..... 134/123 |
| 8,323,506 B2* | 12/2012 | Gannon .................... 210/693 |
| 2003/0047522 A1* | 3/2003 | Gannon et al. ........... 210/799 |
| 2003/0047523 A1* | 3/2003 | Gannon .................... 210/799 |
| 2005/0051480 A1* | 3/2005 | Newman ................... 210/615 |
| 2005/0082230 A1* | 4/2005 | Gonzales et al. ......... 210/690 |
| 2005/0230302 A1* | 10/2005 | Muir et al. ................ 210/290 |
| 2007/0084808 A1* | 4/2007 | Williamson et al. ..... 210/806 |
| 2007/0199871 A1* | 8/2007 | Jorgensen ................. 210/187 |
| 2008/0023384 A1* | 1/2008 | Patmore ................... 210/180 |
| 2009/0324336 A1* | 12/2009 | Fossen et al. ............ 405/116 |
| 2011/0094952 A1* | 4/2011 | Dana et al. ............... 210/185 |
| 2011/0203996 A1* | 8/2011 | Monsalve ................. 210/691 |
| 2011/0253641 A1* | 10/2011 | Pearse et al. ............ 210/747.3 |
| 2011/0309091 A1* | 12/2011 | O'Connor ................. 220/694 |
| 2012/0211425 A1* | 8/2012 | Gannon .................... 210/660 |
| 2012/0325734 A1* | 12/2012 | Gannon .................... 210/282 |

* cited by examiner

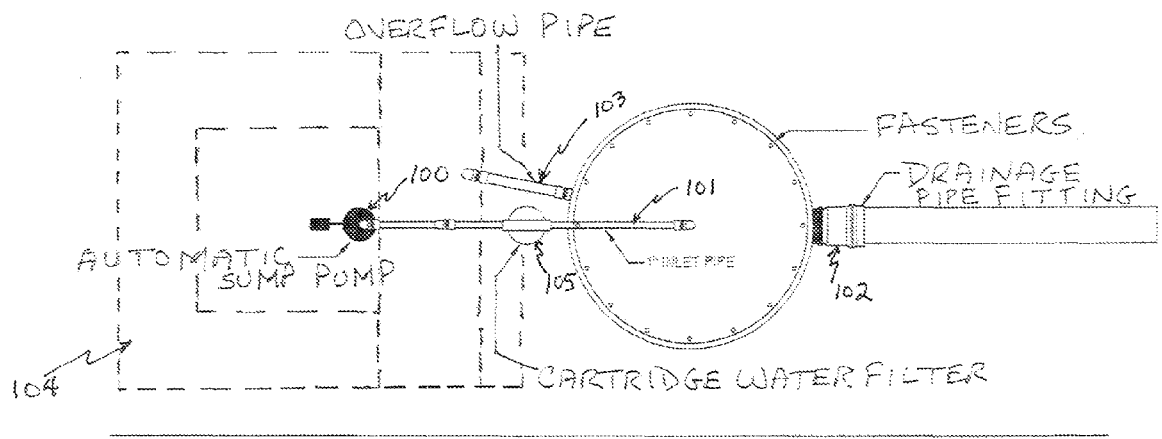
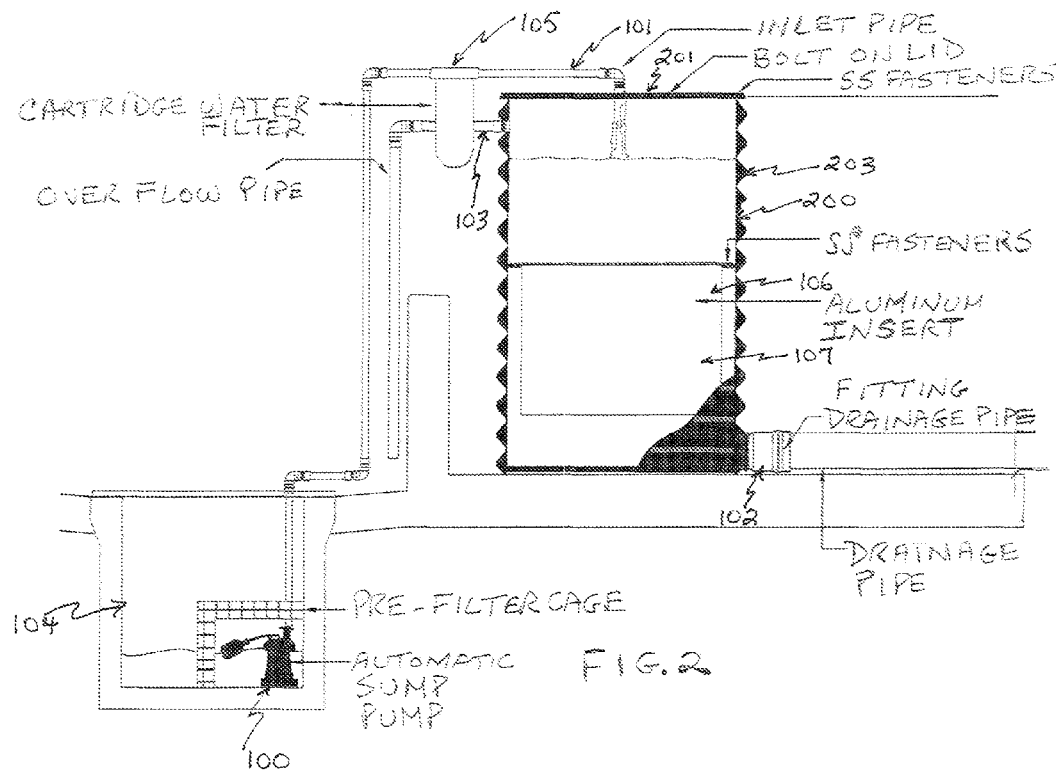

US 8,974,662 B2

FILTRATION OF A PUMPED HYDROCARBON CONTAINING LIQUID

CROSS REFERENCE TO RELATED APPLICATIONS

This is a Continuation-In-Part application claiming priority from applicants' U.S. application Ser. No. 10/284,516, filed on Oct. 30, 2002.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

1. Field of the Invention

This invention relates to an apparatus for and method of treating hydrocarbon contaminated water utilizing a hydrocarbon absorption media. The apparatus and method of the present invention results in an almost maintenance-free way of substantially removing hydrocarbons from water having sheen found in parking lots, and a preferred embodiment is adapted to prevent and contain hydrocarbon spills in containment areas for electrical transformers or oil tanks. This novel system is placed at the discharge of a pumping system rather than placed in drains feeding the system by gravity.

2. Description of Related Art

The problem involves separating hydrocarbon contaminated water that is removed from low lying locations, and that need to drain clean water to a higher elevation, so gravity feed of contaminated drain water through a filtration device will not work; consequently a pumping system must be used which is capable of filtering larger contaminated flows that are necessarily under much higher pressure than gravity fed hydrocarbon contaminated drain cleaning systems in the prior art.

Bearing in mind the problems and deficiencies of the prior art, it is therefore an object of the present invention to provide an apparatus for and method of active treatment of hydrocarbon contaminated water that needs to be pumped from low lying grades to higher elevations, and a system that can function under higher flows and pressures that result. The hydrocarbon contaminated water is rendered substantially hydrocarbon-free for discharge into a stream or ground water.

Still other objects and advantages of the invention will in part be obvious and will in part be apparent from the specification.

BRIEF DESCRIPTION OF THE DRAWINGS

The features of the invention believed to be novel and the elements characteristic of the invention are set forth with particularity in the appended claims. The figures are for illustration purposes only and are not drawn to scale the invention itself, however, both as to organization and method of operation, may best be understood by reference to the detailed description which follows taken in conjunction with the accompanying drawings in which:

FIG. 2 is an elevation view of the embodiment of the invention.

FIG. 2A is a plan view of FIG. 2

DETAILED DESCRIPTION

Figure 1:
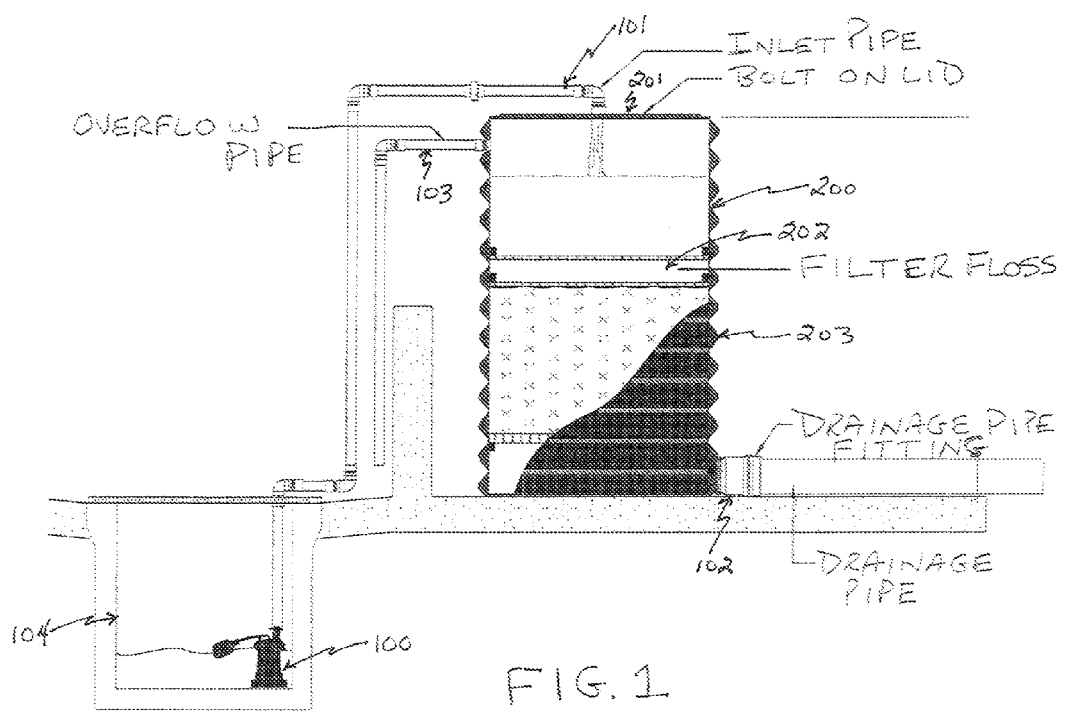
FIG. 1 is a view of an embodiment of the invention.

A vessel (200) containing polymer media (107) [hereinafter "SPI media"] referenced in applicant's parent application Ser. No. 10/284,516 put into a removable cartridge that has a pump (100) from a containment source (104) that has a oil holding tank, vessel or transformer that collects rainwater in an outdoor environment/or maintenance in an indoor water application where oil could appear in water, a bilge in a ship etc. The vessel (200) has an inner housing (106) and is a holding container for the media (107) that is used as a cartridge to allow pumped water from an outside source pumped into the vessel. The vessel will have an inlet (101) for the water to be pumped into and an outlet (102) to discharge the water after it has filtered through the SPI media. The media (107) has the ability to remove oil sheens and oil from small spills without shut off or release of any hydrocarbons after the liquid has passed through the media. In an oil overload the media (107) absorbs the hydrocarbons and tackafies becoming a total solid shutting down any flow through the media. The liquid level on the inside of the vessel (200) will start to rise to the return (103) valve and discharge any liquid back into the containment area (104). This prevents any oil from escaping from the vessel (200) after the media (107) is absorbed with hydrocarbons and shuts any discharge through the media (107). The pump (100) is shut down upon discovery of the hydrocarbon overload and is disconnected. The vessel (200) is cleaned and the cartridge (107) is replaced with a new one and put back into service. The vessel (200) can be made from plastic, HDPE, steel etc. and can be used in small application with an aquarium pump to industrial high volume water pump. The top of the vessel (201) is removable to access the cartridge (107) and will also have removable dirt and debris filters (202) that will sit above the cartridge. These filters (202) will capture any dirt and sediment before it contaminates the cartridge. An external water filter (105) can also be used with the inlet hose prior to the holding vessel (200); this water filter (105) will be able to pre filter the water prior to entering the vessel (200), the filtration cartridges for the water filter can be changed similar to a home water filtration unit.

A vessel is designed to allow water to discharge from a floating roof tank. Floating roof tanks are in tank farms around the world they can sink down to as low as four (4) feet to as high as sixty (60) feet when full of oil. These roof tops typically have seals to prevent any oil from escaping but can burp causing small amounts of oil to large volumes to escape onto the roof top. Each roof top has a water drain in the center of the tank connected to a discharge hose usually 3" in diameter that runs the entire height of the roof and collapse as the roof lowers. The rain water needs to discharge and most tank farms do not have containment for this application. The invention uses the SPI media (107) in different vessels (200) to provide total containment in the event of a straight oil spill.

A vessel (200) similar to the pump through pipe is used on a larger scale with a larger diameter. The problem that exists is the amount of pressure as the elevation of the drain rises without discs on the inside of the vessel the pressure will force the hydrocarbons down the side of the vessel and fail. In our first attempts with just the use of discs failed. We then used a corrugated pipe (203) from top to bottom along with discs which forced the oil inward and back towards the center by adding discs to the corrugated vessel forces the liquid even further into the center of the media (107). In our test from 10 feet we have been successful in stopping the oil. What we found with the corrugated pipe (203) is if we did not structurally hold the pipe down from expanding from the pressure it would expand providing the media on the inside of the vessel to be compromised. Before oil was added the vessel was strapped down and any further expansion was stopped. The water went down to the bottom of the vessel through a pipe and up to the top and enter on the top forcing the water/oil/straight oil down vertically. Another novel approach is to have the water enter the vessel on the bottom and have to rise up through the media and discharge through the top. The vessel can be various heights and built out of different materials.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The invention claimed is:

1. A system for removing hydrocarbons from hydrocarbon contaminated water, said system comprising:
   a sump for collecting hydrocarbon contaminated water;
   a pump located in said sump, said sump collecting hydrocarbon contaminated water, said pump having a float switch operating to automatically start said pump when said sump has collected a predetermined amount of contaminated water;
   a water treatment vessel at a higher level than said sump, including:
   an inlet;
   a lid;
   a pressure switch;
   an overflow pipe fluidically connected at an upper portion of said vessel, with an outlet positioned to return any overflow to said sump;
   a filtration cartridge housing a filtration media capable of absorbing, dissolving and tackifying when exposed to hydrocarbons; and
   a discharge pipe in a lower portion of said water treatment vessel, beneath said filter cartridge;
   a pipe fluidically connecting an outlet of said pump to said inlet of said water treatment vessel;
   wherein, said pump pumps hydrocarbon contaminated water into said water treatment vessel and through said filtration cartridge where hydrocarbons are absorbed, while purified water is allowed to exit said vessel through said discharge pipe, whereupon the pressure switch will act to cease operation of said pump upon reaching a predetermined pressure caused by accumulation of hydrocarbons in said filtration cartridge, while said overflow pipe will return hydrocarbon contaminated water to said sump when the level of liquid within said vessel exceeds a predetermined level.

2. The system of claim 1, further comprising a pre-filter cage around said pump to prevent solid debris from entering said pump.

3. The system of claim 1, further comprising a layer of filter floss above said cartridge through which said hydrocarbon contaminated flows before entering said filtration cartridge.

* * * * *